(12) United States Patent
Cho et al.

(10) Patent No.: US 11,204,740 B2
(45) Date of Patent: Dec. 21, 2021

(54) NEUROMORPHIC ARITHMETIC DEVICE AND OPERATING METHOD THEREOF

(71) Applicant: ELECTRONICS AND TELECOMMUNICATIONS RESEARCH INSTITUTE, Daejeon (KR)

(72) Inventors: Min-Hyung Cho, Daejeon (KR); Young-deuk Jeon, Sejong-si (KR); Ki Hyuk Park, Daejeon (KR); Joo Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 143 days.

(21) Appl. No.: 16/695,509

(22) Filed: Nov. 26, 2019

(65) Prior Publication Data
US 2020/0174751 A1 Jun. 4, 2020

(30) Foreign Application Priority Data

Dec. 4, 2018 (KR) .................. 10-2018-0154817
Aug. 23, 2019 (KR) .................. 10-2019-0103396

(51) Int. Cl.
*G06F 7/544* (2006.01)
*G06N 3/063* (2006.01)

(52) U.S. Cl.
CPC .......... *G06F 7/5443* (2013.01); *G06N 3/063* (2013.01)

(58) Field of Classification Search
CPC .................. G06F 7/5443; G06N 3/063
See application file for complete search history.

(56) References Cited

U.S. PATENT DOCUMENTS

| | | | |
|---|---|---|---|
| 5,220,559 A | 6/1993 | Tsuzuki et al. | |
| 10,515,303 B2* | 12/2019 | Lie ........................ | G06F 9/4881 |
| 2011/0119215 A1 | 5/2011 | Elmegreen et al. | |
| 2011/0153995 A1 | 6/2011 | Byun et al. | |
| 2017/0357889 A1* | 12/2017 | Zhang ................... | G06F 1/3293 |
| 2018/0018559 A1 | 1/2018 | Yakopcic et al. | |
| 2018/0129935 A1 | 5/2018 | Kim et al. | |
| 2018/0253643 A1 | 9/2018 | Buchanan et al. | |
| 2020/0143229 A1* | 5/2020 | Van Der Made ...... | G06N 3/088 |

OTHER PUBLICATIONS

Beiye Liu, et al., "Digital-Assisted Noise-Eliminating Training for Memristor Crossbar-based Analog Neuromorphic Computing Engine", 2013 50th ACM/EDAC/IEEE Design Automation Conference (DAC), 2013.

* cited by examiner

*Primary Examiner* — Michael D. Yaary
(74) *Attorney, Agent, or Firm* — LRK Patent Law Firm

(57) ABSTRACT

The neuromorphic arithmetic device performs a multiply-accumulate (MAC) calculation using a multiplier and an accumulator. The neuromorphic arithmetic device includes an offset accumulator configured to receive a plurality of offset data measured a plurality of times and accumulate the plurality of offset data, a bit extractor configured to obtain average offset data by extracting at least one first bit from the plurality of accumulated offset data, and a cumulative synapse array configured to accumulate a plurality of multiplication values generated by the multiplier and output a cumulative result of the plurality of multiplication values corrected according to the average offset data.

12 Claims, 8 Drawing Sheets

NEUROMORPHIC ARITHMETIC DEVICE AND OPERATING METHOD THEREOF

CROSS-REFERENCE TO RELATED APPLICATIONS

This U.S. non-provisional patent application claims priority under 35 U.S.C. § 119 of Korean Patent Application Nos. 10-2018-0154817, filed on Dec. 4, 2018, and 10-2019-0103396, filed on Aug. 23, 2019, the entire contents of which are hereby incorporated by reference.

BACKGROUND

1. Field of the Invention

The present disclosure relates to a neuromorphic arithmetic device, and more particularly, to a neuromorphic arithmetic device capable of performing offset correction and an operating method thereof.

2. Description of Related Art

Neuromorphic arithmetic devices are devices that process data by mimicking the human brain. The brain may transmit signals from one neuron to another through synapses between neurons. The brain may adjust the intensity of the signal transmitted from neurons to other neurons by adjusting the synaptic connection strength. That is, information may be learned and inferred by adjusting the synaptic connection strength. Neuromorphic arithmetic devices may process data based on a signal transmission scheme between neurons. Neural processing refers to processing data using such signal processing.

For neural processing requiring extensive computation, neuromorphic arithmetic devices may be implemented with low power and low area analog multiplier-accumulators (MAC). The analog MAC converts a plurality of digital input signals into analog signals and combines and converts the converted analog signals into digital signals. The analog MAC may multiply input data by 1 bit to improve accuracy, and perform MAC operation based on 1-bit multiplication results. When neuromorphic arithmetic devices operate based on such MAC operation, the reliability and recognition rate of neural processing may be degraded according to the offset error.

SUMMARY

The present disclosure provides a neuromorphic arithmetic device capable of performing offset correction and an operating method thereof.

An embodiment of the inventive concept provides a neuromorphic arithmetic device that performs a multiply-accumulate (MAC) calculation using a multiplier and an accumulator, the device including: an offset accumulator configured to receive a plurality of offset data measured a plurality of times and accumulate the plurality of offset data; a bit extractor configured to obtain average offset data by extracting at least one first bit from the plurality of accumulated offset data; and a cumulative synapse array configured to accumulate a plurality of multiplication values generated by the multiplier and output a cumulative result of the plurality of multiplication values corrected according to the average offset data.

In an embodiment of the inventive concept, an operating method of a neuromorphic arithmetic device includes: measuring a plurality of offset data by a plurality of times; accumulating the plurality of offset data; obtaining an average offset data by extracting at least one first bit from the plurality of accumulated offset data; calculating a plurality of multiplication values between a plurality of feature data and a plurality of weight data; accumulating the plurality of multiplication values; and correcting a cumulative result of the plurality of multiplication values according to the average offset data.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

Figure 1:
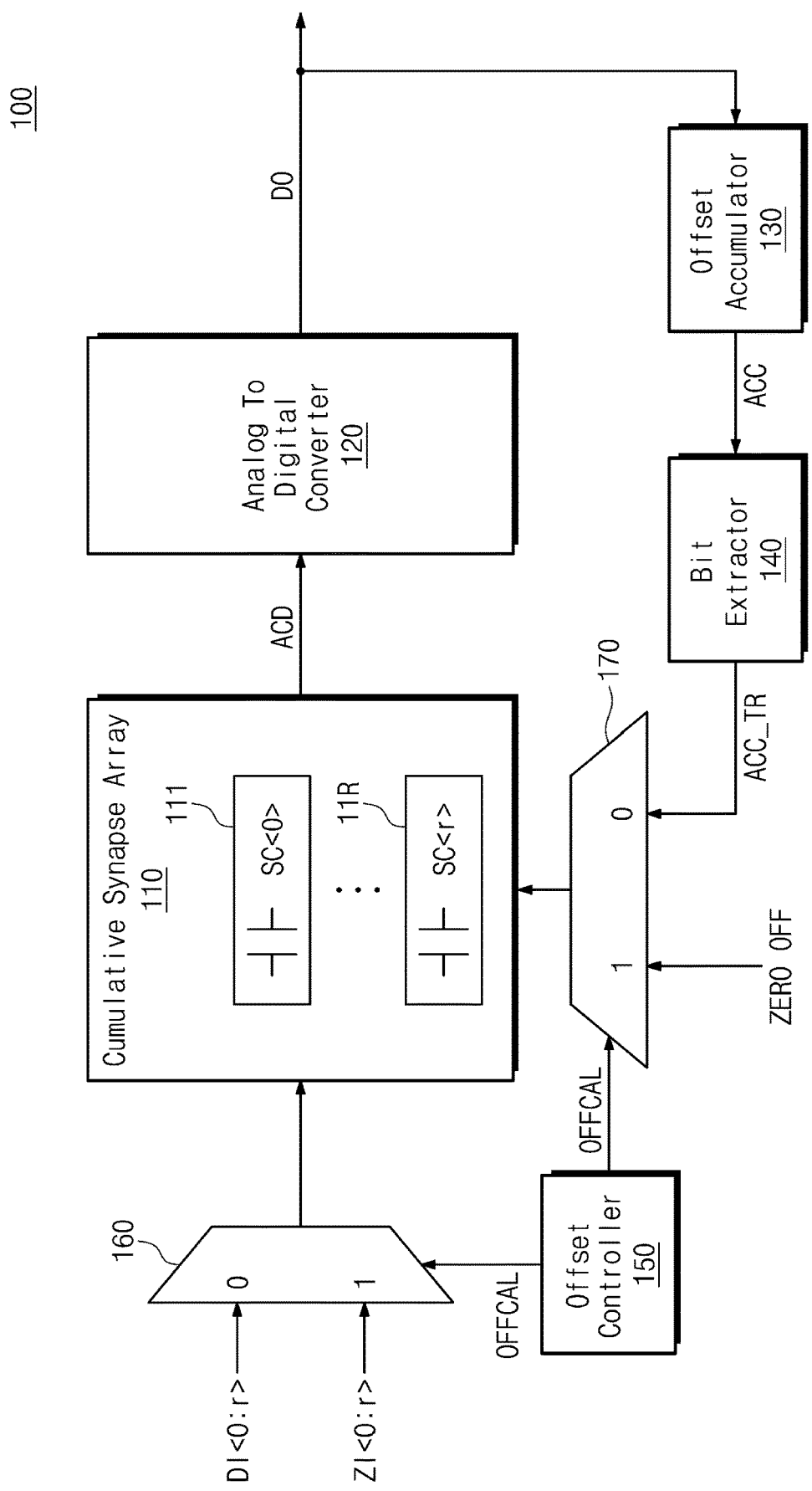
FIG. 1 is a block diagram illustrating a neuromorphic arithmetic device according to an embodiment of the inventive concept.

FIG. 1 is a block diagram illustrating a neuromorphic arithmetic device according to an embodiment of the inventive concept. The neuromorphic arithmetic device 100 may perform addition or accumulation of multiply-accumulate (MAC) operations. For example, the neuromorphic arithmetic device 100 may be referred to as an accumulator. The neuromorphic arithmetic device 100 may measure or calculate an offset (or offset error, offset data, offset error data, etc.) generated during a cumulative calculation, and output a calculation result calculated through offset correction based on the measured offset. The neuromorphic arithmetic device 100 may operate in a plurality of operating modes. For example, the plurality of operating modes may include an offset mode for calculating an offset for correcting an offset, and a calculation mode for outputting a calculation result calculated through the offset correction. Operating modes of the neuromorphic arithmetic device 100 may be controlled according to the offset controller 150 described later.

The neuromorphic arithmetic device 100 may receive multiplication values DI<0:r> (r is an integer greater than or equal to 0), offset input values ZI<0:r>, and offset inactive data ZERO OFF (which will be described with a second multiplexer 170) from another device (e.g., a multiplier 1100 of FIG. 5 or a preprocessor 2100 of FIG. 6). The multiplication values DI<0:r> and the offset input values ZI<0:r> may be analog signals such as current, voltage, and the like, and the offset inactive data ZERO OFF may be digital signals. For example, the multiplication values DI<0:r> and the offset input values ZI<0:r> may each be r+1 bits. The neuromorphic arithmetic device 100 may simultaneously receive multiplication values DI<0:r> in a calculation mode. The multiplication values DI<0:r> may be the results calculated from the multiplication of the MAC calculation. The calculation of the multiplication values DI<0:r> by the multiplication of the MAC calculation will be described in more detail with reference to FIG. 5. The neuromorphic arithmetic device 100 may receive offset input values ZI<0:r> in an offset mode. The neuromorphic arithmetic device 100 may measure or calculate an offset from the offset input values ZI<0:r>. For example, the offset input values ZI<0:r> may be all zero values.

The neuromorphic arithmetic device 100 may include a cumulative synapse array 110, an analog to digital converter 120, an offset accumulator 130, a bit extractor 140, an offset controller 150, a first multiplexer 160, and a second multiplexer 170. The cumulative synapse array 110 may include first to R-th cumulative calculation elements 111 to 11R (R=r+1). The first to R-th cumulative calculation elements 111 to 11R may include various analog elements, such as a capacitor, a resistor, and a current source, in consideration of calculation schemes and storage schemes of calculation values. For example, the first to R-th cumulative calculation elements 111 to 11R may include first to R-th capacitors SC<0> to SC<r>, respectively. The numbers of the first to R-th cumulative calculation elements 111 to 11R and the first to R-th capacitors SC<0> to SC<r> may be equal to the numbers (r+1) of the bits of the multiplication values DI<0:r> and the offset input values ZI<0:r>. In one example, capacitance values of the first to R-th capacitors SC<0> to SC<r> may be different from each other according to calculation schemes and storage schemes of calculation values.

The cumulative synapse array 110 may receive multiplication values DI<0:r> in calculation mode and receive offset input values ZI<0:r> in offset mode. The first to R-th cumulative calculation elements 111 to 11R may store the multiplication values DI<0:r> or the offset input values ZI<0:r> in bit units. For example, the first to R-th capacitors SC<0> to SC<r> of the first to R-th cumulative calculation elements 111 to 11R may store multiplication values DI<0:r> or offset input values ZI<0:r> in bit units depending on the manner in which charge is stored by voltages corresponding to bits of multiplication values DI<0:r> or offset input values ZI<0:r>. That is, the first to R-th capacitors SC<0> to SC<r> may be charged by voltages corresponding to bits of the multiplication values DI<0:r> or the offset input values ZI<0:r>.

The first to R-th cumulative calculation elements 111 to 11R may add or accumulate the multiplication values DI<0:r> or the offset input values ZI<0:r> stored in bit units at the same time. For example, when the first to R-th capacitors SC<0> to SC<r> of the first to R-th cumulative calculation elements 111 to 11R are connected in parallel to each other, the multiplication values DI<0:r> or the offset input values ZI<0:r> stored in bit units may be accumulated. The cumulative synapse array 110 may output accumulated multiplication values DI<0:r> or accumulated offset input values ZI<0:r>. The accumulated multiplication values DI<0:r> and the accumulated offset input values ZI<0:r> may be referred to as cumulative calculation values ACD. The cumulative synapse array 110 may output cumulative calculation values ACD as analog signals such as current and voltage. In calculation mode, the first to R-th cumulative calculation elements 111 to 11R may add or accumulate the multiplication values DI<0:r> stored in bits through an offset correction according to an average offset data ACC_TR. Specifically, the first to R-th cumulative calculation elements 111 to 11R adjust the charges stored in the first to R-th capacitors SC<0> to SC<r> or the voltages of the first to R-th capacitors SC<0> to SC<r> in order for offset correction according to the average offset data ACC_TR, thereby adding or accumulating the multiplication values DI<0:r> stored in bits.

The analog to digital converter 120 may receive cumulative calculation values ACD from the cumulative synapse array 110. The analog to digital converter 120 may convert cumulative calculation values ACD from an analog signal to a digital signal. The analog to digital converter 120 may output digitally converted cumulative calculation values, and the digitally converted cumulative calculation values may be referred to as output data DO. In detail, the output data DO generated based on the offset input values ZI<0:r> in the offset mode may be referred to as offset data. The offset data will be described in more detail in FIG. 2.

In the offset mode, the offset accumulator 130 may receive output data DO, which is offset data. In the offset mode, the neuromorphic arithmetic device 100 may calculate or measure offsets by a predetermined number of times, and the offset accumulator 130 may receive offset data by a predetermined number of times. For example, the predetermined number of times may be $2^k$ (k is an integer of 1 or more). The offset accumulator 130 may generate offset accumulation data ACC based on the offset data obtained by a predetermined number of times. For example, the offset accumulator 130 may generate the accumulated data ACC by adding or accumulating offset data obtained by a predetermined number of times. The offset accumulator 130 may provide offset accumulation data ACC to the bit extractor 140. In one example, the offset accumulator 130 may generate offset accumulation data ACC by adding or accumulating offset data obtained by a predetermined number of times in offset mode, and provide the offset accumulated data ACC to the bit extractor 140 in calculation mode. Or, in another example, the offset accumulator 130 may generate offset accumulating data ACC by adding or accumulating the offset data obtained by at least one predetermined number of times in the offset mode, and also provide the offset accumulating data ACC to the bit extractor 140.

The bit extractor 140 may generate the average offset data ACC_TR based on the offset accumulation data ACC. For example, the bit extractor 140 may generate the average offset data ACC_TR by extracting or truncating at least one bit among a plurality of bits included in the offset accumulation data ACC. The bit extractor 140 may provide the average offset data ACC_TR to the first multiplexer 160 in an offset mode or an operating mode. The bit extractor 140 may be referred to as a truncator. The operation method of the offset accumulator 130 and the bit extractor 140 will be described in more detail in FIG. 2.

The offset controller 150 may control a first multiplexer 160 and a second multiplexer 170. The offset controller 150 may provide a control signal OFFCAL to the first multiplexer 160 and the second multiplexer 170.

The first multiplexer 160 may receive multiplication values DI<0:r> and offset input values ZI<0:r>. The first multiplexer 160 may selectively output multiplication values DI<0:r> and offset input values ZI<0:r> according to the offset controller 150. The offset controller 150 may control the first multiplexer 160 to provide offset input values ZI<0:r> to the cumulative synapse array 110 in the offset mode, and then control the first multiplexer 160 to provide multiplication values DI<0:r> to the cumulative synapse array 110 in the calculation mode. For example, if the control signal OFFCAL corresponds to a logic high ('1') for activating the offset mode, the first multiplexer 160 may provide offset input values ZI<0:r> to the cumulative synapse array 110, and if the control signal OFFCAL corresponds to a logic low '0' for activating the calculation mode, the first multiplexer 160 may provide multiplication values DI<0:r> to the cumulative synapse array 110.

The second multiplexer 170 may receive the average offset data ACC_TR and offset inactive data ZERO OFF. The second multiplexer 170 may selectively output the average offset data ACC_TR and the offset inactive data ZERO OFF according to the offset controller 150. The offset controller 150 may control the second multiplexer 170 to provide offset inactive data ZERO OFF to the cumulative synapse array 110 in the offset mode, and then control the second multiplexer 170 to provide the average offset data ACC_TR to the cumulative synapse array 110 in the calculation mode. For example, if the control signal OFFCAL corresponds to a logic high ('1') for activating the offset mode, the second multiplexer 170 may provide offset inactive data ZERO OFF to the cumulative synapse array 110, and if the control signal OFFCAL corresponds to a logic low ('0') for activating the calculation mode, the second multiplexer 170 may provide the average offset data ACC_TR to the cumulative synapse array 110.

In the offset mode, the neuromorphic arithmetic device 100 may calculate the average offset data ACC_TR based on the offset input values ZI<0:r>. In calculation mode, the neuromorphic arithmetic device 100 may perform a cumulative calculation based on multiplication values DI<0:r>, but correct the offset error generated during cumulative calculation using the average offset data ACC_TR calculated in the offset mode. Specifically, according to the average offset data ACC_TR provided to the cumulative synapse array 110, the offset may be corrected by adjusting charges stored in the first to R-th capacitors SC<0> to SC<r> in the cumulative synapse array 110 or voltages of the first to R-th capacitors SC<0> to SC<r>. For example, the offset may be corrected by calculating the difference between voltages according to the average offset data ACC_TR provided to the cumulative synapse array 110 and voltages of the first to R-th capacitors SC<0> to SC<r> in the cumulative synapse array 110. That is, the neuromorphic arithmetic device 100 performs offset correction in the analog calculation operation of the cumulative synapse array 110 including the various analog elements so that the offset error that occurs during MAC calculation may be effectively eliminated. In one embodiment, the offset accumulator 130 and the bit extractor 140 may be implemented with logical elements such as AND, OR, XOR, NOR, latch, flip-flop, and the like, and combinations thereof. Also, the analog to digital converter 120 and the offset controller 150 may be implemented with dedicated circuits (e.g., Field Programmable Gate Arrays (FPGAs), Application Specific Integrated Circuits (ASICs), and the like or may be implemented with a System on Chip (SoC).

Figure 2:
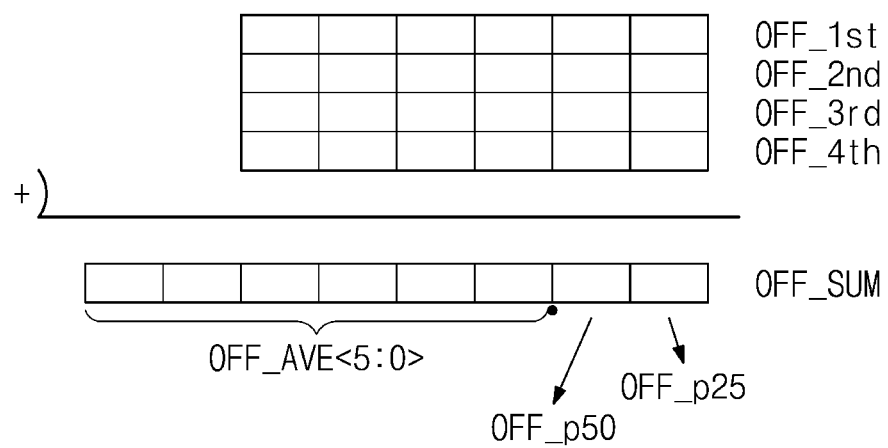
FIG. 2 is a conceptual diagram illustrating a method of operating an offset accumulator and a bit extractor of the neuromorphic arithmetic device of FIG. 1.

FIG. 2 is a conceptual diagram illustrating a method of operating an offset accumulator and a bit extractor of the neuromorphic arithmetic device of FIG. 1. In FIG. 2, it is assumed that the neuromorphic arithmetic device 100 operating in the offset mode measures the offsets four times. Accordingly, the analog to digital converter 120 of the neuromorphic arithmetic device 100 operating in the offset mode may output the first to fourth offset data OFF_1st, OFF_2nd, OFF_3rd, and OFF_4th as output data DO. Each of the first to fourth offset data OFF_1st, OFF_2nd, OFF_3rd, and OFF_4th may be binary data represented by at least one bit. In FIG. 2, the first to fourth offset data OFF_1st, OFF_2nd, OFF_3rd, and OFF_4th are assumed to be 6 bits of binary data. The above numerical values are merely exemplary values.

In the offset mode, the offset accumulator 130 may receive the first to fourth offset data OFF_1st, OFF_2nd, OFF_3rd, and OFF_4th. The offset accumulator 130 may generate the offset accumulation data OFF_SUM by adding or accumulating the first to fourth offset data OFF_1st, OFF_2nd, OFF_3rd, and OFF_4th. The offset accumulation data OFF_SUM may be the same as the offset accumulation data ACC of FIG. 1. The offset accumulator 130 may provide the offset accumulator data OFF_SUM to the bit extractor 140. When the first to fourth offset data OFF_1st, OFF_2nd, OFF_3rd, and OFF_4th are 6 bits of binary data, the offset accumulation data OFF_SUM may be at least 8 bits of binary data. In FIG. 2, the offset accumulation data OFF_SUM is assumed to be 8 bits.

The bit extractor 140 may extract or truncate at least one bit among the bits included in the offset accumulation data OFF_SUM. When the bit extractor 140 extracts a plurality of bits from the offset accumulation data OFF_SUM, the plurality of bits may be continuous. In FIG. 2, for example, the bit extractor 140 may extract the upper five bits OFF_AVE<5:0> (e.g., bits indicating $2^7$ to $2^2$ in the offset accumulation data OFF_SUM) of the offset accumulation data OFF_SUM, or truncate the lower two bits OFF_p50 and OFF_p25 (e.g., bits indicating $2^1$ to $2^0$ in the offset accumulation data OFF_SUM). The upper five bits of the offset accumulation data OFF_SUM may be referred to as offset average bits OFF_AVE<5:0>. The lower two bits of the offset accumulation data OFF_SUM may be respectively referred to as a first offset decimal bit OFF_p50 (e.g., a bit indicating $2^1$ in the offset accumulation data OFF_SUM) and a second offset decimal bit OFF_p25 (e.g., a bit indicating $2^0$ in the offset accumulation data OFF_SUM).

The extracted offset average bits OFF_AVE<5:0> may be average offset data ACC_TR of FIG. 1. As a result, the bit extractor 140 may extract the offset average bits OFF_AVE<5:0> of the offset accumulation data OFF_SUM, or truncate the first and second offset fractional bits OFF_p50 and OFF_p25 to generate average offset data ACC_TR. Since the neuromorphic arithmetic device 100 calculates or measures offsets by $2^k$ (k is an integer of 1 or more) such as 4 times, as the first and second offset decimal bits OFF_p50 and OFF_p25 are truncated, an average (offset average bits OFF_AVE<5:0> and average offset data ACC_TR) of the first to fourth offset data OFF_1st, OFF_2nd, OFF_3rd, and OFF_4th may be obtained.

The first and second offset decimal bits OFF_p50 and OFF_p25 may include detailed information on the average offset data ACC_TR of FIG. 1. For example, the first offset decimal bit OFF_p50 may include a value for 0.5 unit on the decimal system of the average offset data ACC_TR, and the second offset decimal bit OFF_p25 may include a value for 0.25 unit on the decimal system of the average offset data ACC_TR. The bit extractor 140 may provide the cumulative synapse array 110 with the first and second offset decimal bits OFF_p50 and OFF_p25 in calculation mode, and the offset may be corrected for values for 0.25 and 0.5 units on the decimal system of the average offset data ACC_TR generated on the cumulative synapse array 110 according to the first and second offset decimal bits OFF_p50 and OFF_p25. Therefore, the noise margin of the analog MAC calculation result may be significantly increased.

Figure 3:
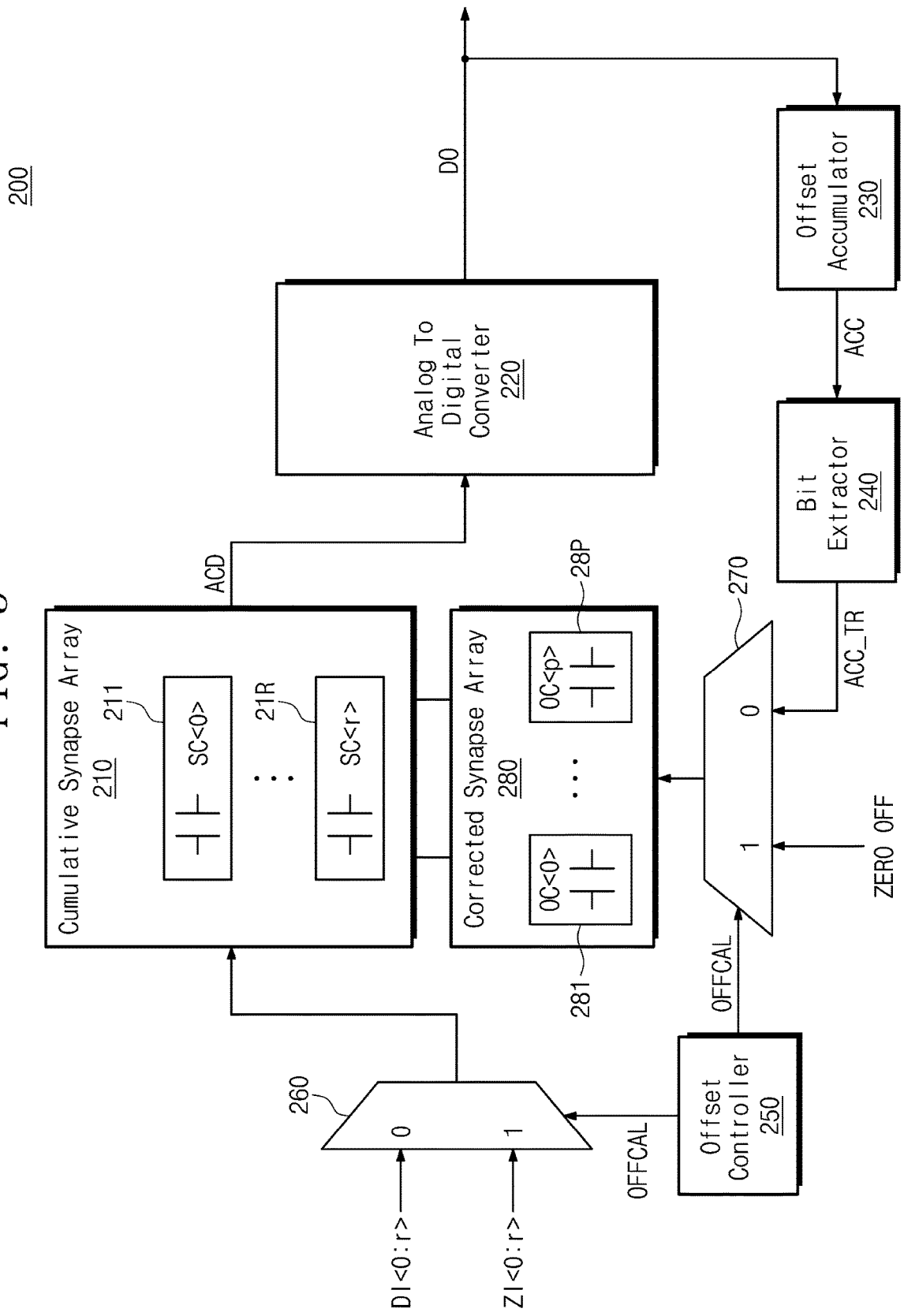
FIG. 3 is a block diagram illustrating a neuromorphic arithmetic device according to another embodiment of the inventive concept.

FIG. 3 is a block diagram illustrating a neuromorphic arithmetic device according to another embodiment of the inventive concept. FIG. 3 will be described with reference to FIG. 1. The neuromorphic arithmetic device 200 may include a cumulative synapse array 210, an analog to digital converter 220, an offset accumulator 230, a bit extractor 240, an offset controller 250, a first multiplexer 260, a second multiplexer 270, and a corrected synapse array 280. The cumulative synapse array 210 may include first to R-th cumulative calculation elements 211 to 21r. The cumulative synapse array 210, the analog to digital converter 220, the offset accumulator 230, the bit extractor 240, the offset controller 250, the first multiplexer 260, the second multiplexer 270, and the first to R-th cumulative calculation elements 211 to 21r of FIG. 2 may be implemented using substantially the same principle as the cumulative synapse array 110, the analog to digital converter 120, the offset accumulator 130, the bit extractor 140, the offset controller 150, the first multiplexer 160, the second multiplexer 170, and the first to R-th cumulative calculation elements 111 to 11R of FIG. 1, respectively.

The corrected synapse array 280 may be connected between the second multiplexer 270 and the cumulative synapse array 210. The corrected synapse array 280 may include first to P-th correction calculation elements 281 to 28P (p is an integer of 1 or more, P=p+1). The first to P-th correction calculation elements 281 to 28P may include various analog elements, such as a capacitor, a resistor, and a current source, in consideration of calculation schemes and storage schemes of calculation values. The first to P-th correction calculation elements 281 to 28P may include elements of the same kind as elements included in the first to R-th cumulative calculation elements 211 to 21r. In FIG. 3, the first to P-th correction calculation elements 281 to 28P may include first to P-th capacitors OC<0> to OC<p>. The first to P-th capacitors OC<0> to OC<p> in the corrected synapse array 280 may be referred to as offset capacitors, and the first through R-th capacitors SC<0> to SC<r> in the cumulative synapse array 210 may be referred to as accumulation capacitors. The number of first to P-th correction calculation elements 281 to 28P and the first to P-th capacitors OC<0> to OC<p> may be the same as the number of bits of the average offset data ACC_TR.

The offset controller 250 may control the second multiplexer 270 to provide offset inactive data ZERO OFF to the corrected synapse array 280 in the offset mode, and then control the second multiplexer 270 to provide average offset data ACC_TR to the corrected synapse array 280 in the calculation mode. For example, if the control signal OFFCAL corresponds to a logic high ('1') for activating the offset mode, the second multiplexer 270 may provide offset inactive data ZERO OFF to the corrected synapse array 280, and if the control signal OFFCAL corresponds to a logic low ('0') for activating the calculation mode, the second multiplexer 270 may provide average offset data ACC_TR to the corrected synapse array 280.

The first to P-th capacitors OC<0> to OC<p> in the corrected synapse array 280 may store average offset data ACC_TR in bit units. For example, the first to P-th capacitors OC<0> to OC<p> of the first to P-th correction calculation elements 281 to 28P may store the average offset data ACC_TR in bit units according to the manner of storing the charge by the voltages corresponding to the bits of the average offset data ACC_TR.

The first to P-th correction calculation elements 281 to 28P may add or accumulate average offset data ACC_TR stored in bit units. For example, when the first to P-th capacitors OC<0> to OC<p> of the first to P-th correction calculation elements 281 to 28P are connected to each other in parallel, the average offset data ACC_TR stored in bit units may be accumulated. The cumulative calculation values ACD stored in the first to R-th capacitors SC<0> to SC<r> of the cumulative synapse array 210 may be corrected according to the accumulated average offset data ACC_TR. In order for offset correction, the first to R-th cumulative calculation elements 211 to 21R may accumulate charges stored in the first to R-th capacitors SC<0> to SC<r> or voltages of the first to R-th capacitors SC<0> to SC<r> based on the voltages of the first to P-th capacitors OC<0> to OC<p> in the first to P-th correction calculation elements 281 to 28P.

Figure 4:
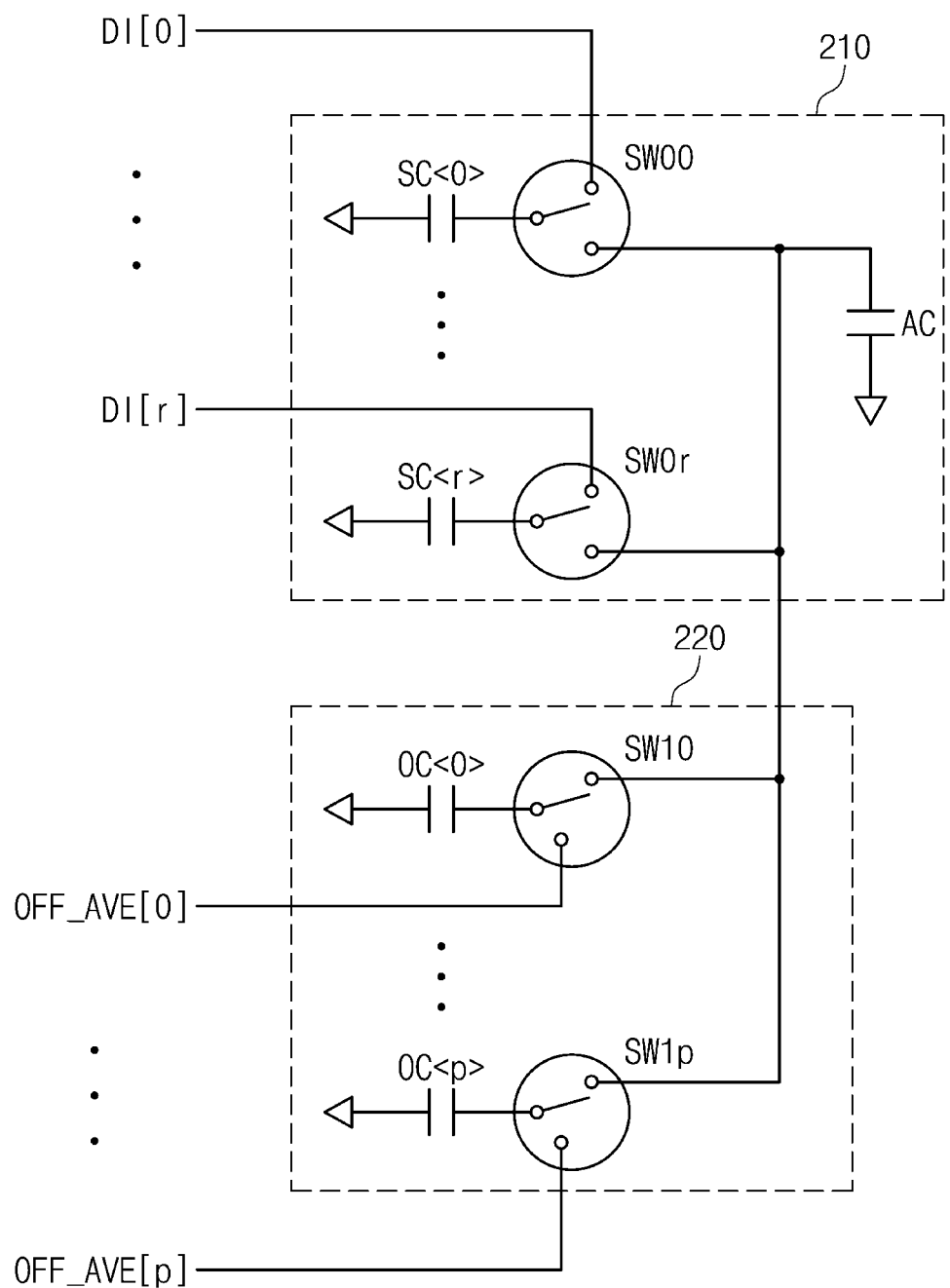
FIG. 4 is a circuit diagram illustrating the neuromorphic arithmetic device of FIG. 3 in more detail.

FIG. 4 is a circuit diagram illustrating the neuromorphic arithmetic device of FIG. 3 in more detail. FIG. 4 will be described with reference to FIGS. 1 to 3. In FIG. 4, for convenience of description, only cumulative synapse array 210 and corrected synapse array 280 of the neuromorphic arithmetic device 200 are shown. The neuromorphic arithmetic device 200 of FIG. 4 is assumed to operate in the calculation mode. Accordingly, the cumulative synapse array 210 may receive the multiplication values DI<0:r> and receive the average offset data OFF_AVE<p:0> or ACC_TR and the first and second offset decimal bits OFF_p50 and OFF_p25 of FIG. 2.

The cumulative synapse array 210 may further include first to R-th switches SW00 to SW0r and a correction capacitor AC. One ends of the first to R-th switches SW00 to SW0r may be connected to the first to R-th capacitors SC<0> to SC<r>, respectively. The other ends of the first to R-th switches SW00 to SW0r may receive multiplication values DI<0:r> or may be connected to the correction capacitor AC, respectively. The first to R-th switches SW00 to SW0r may operate according to a control signal of the offset controller 250 transmitted through the second multiplexer 270.

The corrected synapse array 280 may further include first to P-th switches SW10 to SW1p. One ends of the first to P-th switches SW10 to SW1p may be connected to the first to P-th capacitors OC<0> to OC<p>, respectively. The other ends of the first to P-th switches SW10 to SW1p may receive the bits of the average offset data OFF_AVE<p:0>, or may be connected to the correction capacitor AC, respectively. The first to P-th switches SW10 to SW1p may operate according to a control signal of the offset controller 250 transmitted through the second multiplexer 270. The first to R-th switches SW00 to SW0r and the first to P-th switches SW10 to SW1p may be implemented using transistors (e.g., NMOS, PMOS, or a combination of NMOS and PMOS).

When the first to R-th switches SW00 to SW0r receive the multiplication values DI<0:r> under the control of the offset controller 250, the first to R-th capacitors SC<0> to SC<r> may be charged by voltages corresponding to multiplication values DI<0:r>, respectively, and may store the charges corresponding to the multiplication values DI<0:r>. The first to R-th switches SW00 to SW0r may simultaneously receive multiplication values DI<0:r> and the first to R-th capacitors SC<0> to SC<r> may be simultaneously charged.

When the first to P-th switches SW10 to SW1p receive the bits of the average offset data OFF_AVE<p:0> under the control of the offset controller 250, the first to P-th capacitors OC<0> to OC<p> may be charged by voltages corresponding to bits of the average offset data OFF_AVE<p:0>, respectively, and may store the charges corresponding to the bits of the average offset data OFF_AVE<p:0>. The first to P-th switches SW10 to SW1p may simultaneously receive the bits of the average offset data OFF_AVE<p:0>, and the first to P-th capacitors OC<0> to OC<p>) may be charged at the same time.

After the first to R-th capacitors SC<0> to SC<r> and the first to P-th capacitors OC<0> to OC<p> are charged, the first to R-th switches SW00 to SW0r and the first to P-th switches SW10 to SW1p may be connected to the correction capacitor AC under the control of the offset controller 250. The first to R-th switches SW00 to SW0r may be connected to the correction capacitor AC at the same time, and the first to P-th switches SW10 to SW1p may be connected to the correction capacitor AC at the same time. However, the time when the first to R-th switches SW00 to SW0r are connected to the correction capacitor AC and the time when the first to P-th switches SW10 to SW1p are connected to the correction capacitor AC may be the same or may be different.

The correction capacitor AC may be connected to the first to R-th capacitors SC<0> to SC<r> through the first to R-th switches SW00 to SW0r, and according to the voltages of the first to R-th capacitors SC<0> to SC<r>, the correction capacitor AC may be charged by a voltage corresponding to the accumulated multiplication values DI<0:r> and charges corresponding to the accumulated multiplication values DI<0:r> may be stored. The correction capacitor AC may be further connected to the first to P-th capacitors OC<0> to OC<p> through the first to P-th switches SW10 to SW1p, and according to voltages and charges of the first to P-th capacitors OC<0> to OC<p>, the voltage and charge of the correction capacitor AC may change (increase or decrease). That is, the cumulative calculation result of the multiplication values DI<0:r> may be corrected by the first to P-th capacitors OC<0> to OC<p>.

The corrected synapse array 280 may further include capacitors (not shown) charged by voltages corresponding to the first and second offset decimal bits OFF_p50 and OFF_p25 of FIG. 2. For example, the capacitance of the capacitor charged by the voltage corresponding to the first offset decimal bit OFF_p50 may be different from the capacitance of the capacitor charged by the voltage corresponding to the second offset decimal bit OFF_p25. The capacitance of the capacitor charged by the voltage corresponding to the first offset decimal bit OFF_p50 may be one half of the capacitance of the first to P-th capacitors OC<0> to OC<p> charged by voltages corresponding to the bits of the average offset data OFF_AVE<p:0>. The capacitance of the capacitor charged by the voltage corresponding to the second offset decimal bit OFF_p25 may be one quarter of the capacitance of the first to P-th capacitors OC<0> to OC<p> charged by voltages corresponding to the bits of the average offset data OFF_AVE<p:0>.

Figure 5:
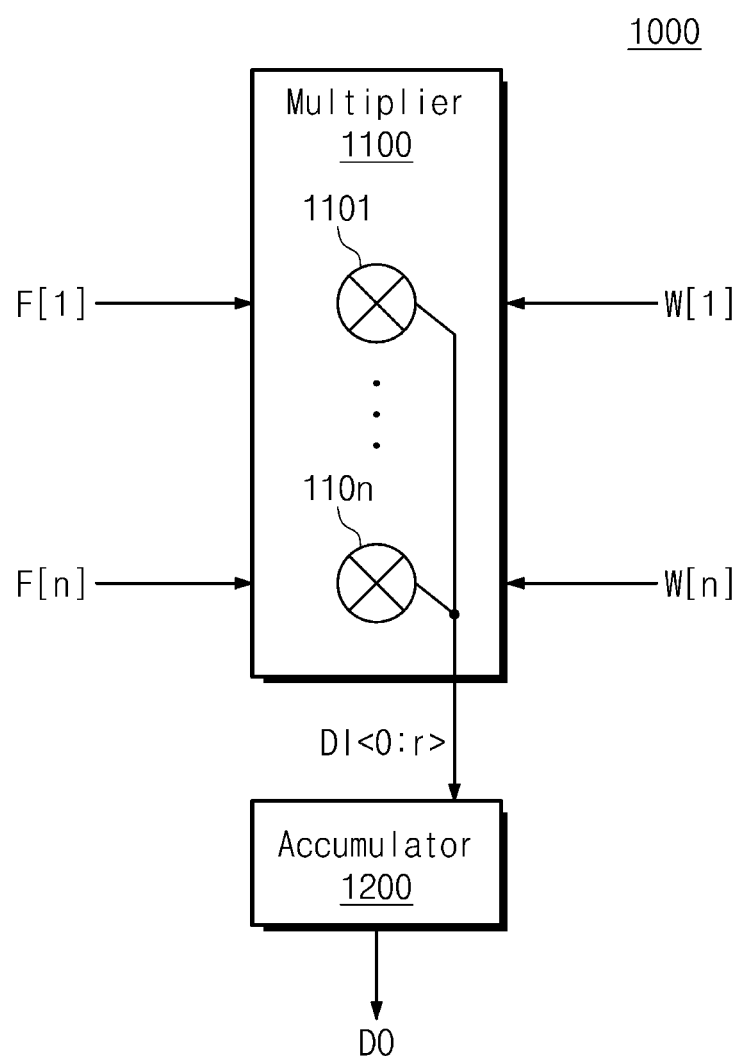
FIG. 5 is a block diagram illustrating a neuromorphic arithmetic device according to another embodiment of the inventive concept.

FIG. 5 is a block diagram illustrating a neuromorphic arithmetic device according to another embodiment of the inventive concept. The neuromorphic arithmetic device 1000 of FIG. 5 may include a multiplier 1100 and an accumulator 1200.

The multiplier 1100 may receive feature data F [1] to F [n] and weight data W [1] to W [n]. Here, n may be an integer of 1 or more. The multiplier 1100 may calculate the multiplication values DI<0:r> (r is n in FIG. 5) from the feature data F [1] to F [n] and the weight data W [1] to W [n]. The multiplier 1100 may provide multiplication values DI<0:r> to the accumulator 1200.

The multiplier 1100 may include first to n-th multiplication calculation elements 1101 to 110n. The first multiplication calculation element 1101 may calculate a multiplication value DI<0> between the first feature data F [1] and the first weighted data W [1], and the n-th multiplication calculation element 110n may calculate a multiplication value DI<r> between the n-th feature data F [n] and the n-th weight data W [n]. The first to n-th multiplication calculation elements 1101 to 110n may be implemented with logical elements such as AND, OR, XOR, NOR, latch, flip-flop, and the like, and combinations thereof.

The accumulator 1200 may perform a calculation that accumulates the multiplication values DI<0:r>. The accumulator 1200 may include components 110 to 170 of FIG. 1, components 210 to 280 of FIG. 2, and components SW00 to SW0r, SW10 to SW1p, and AC of FIG. 4. The accumulator 1200 may operate according to the embodiments and principles described in FIGS. 1 to 4. The accumulator 1200 may output the output data DO as a result of the MAC calculation.

Figure 6:
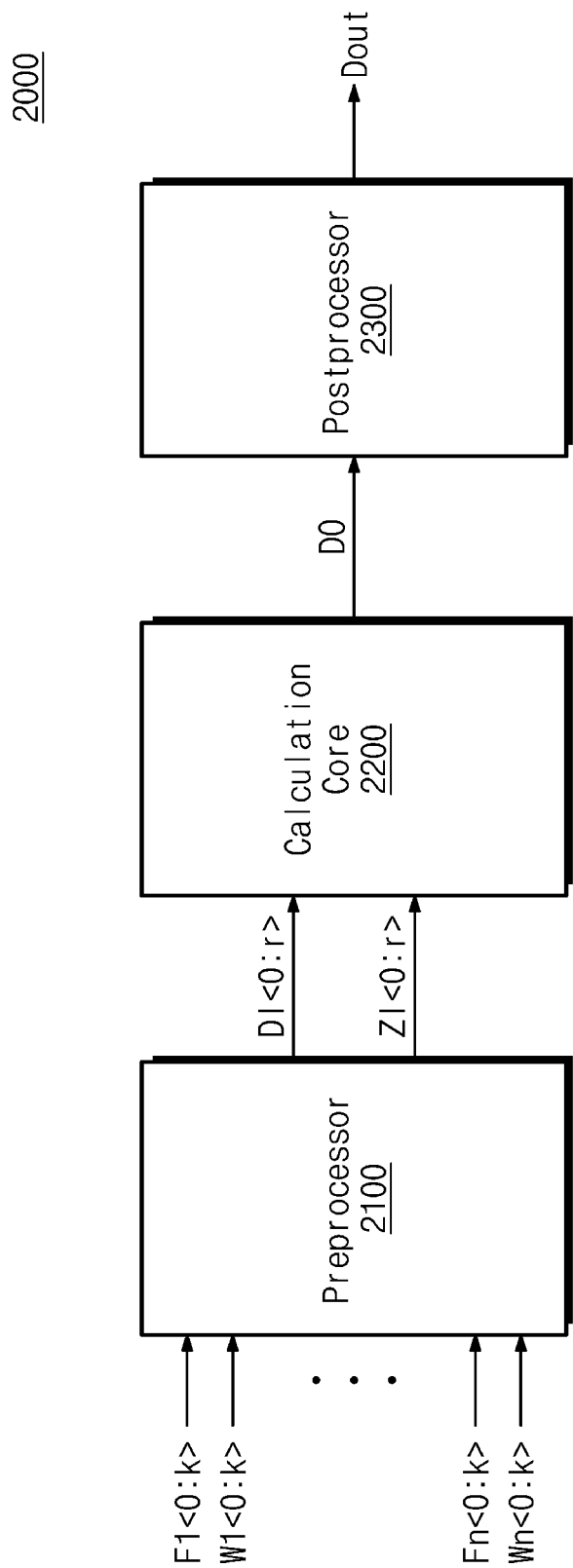
FIG. 6 is a block diagram illustrating a neuromorphic arithmetic device according to another embodiment of the inventive concept.

FIG. 6 is a block diagram illustrating a neuromorphic arithmetic device according to another embodiment of the inventive concept. The neuromorphic arithmetic device 2000 of FIG. 6 may include a preprocessor 2100, a calculation core 2200, and a postprocessor 2300. The neuromorphic arithmetic device 2000 may be referred to as an analog MAC calculator.

The preprocessor 2100 may receive feature data F1<0:k> to Fn<0:k> and weight data W1<0:k> to Wn<0:k>. The feature data F1<0:k> to Fn<0:k> may be the same as the feature data F [1] to F [n] of FIG. 5, respectively, and the weight data W1<0:k> to Wn<0:k> may be the same as the weight data W [1] to W [n] of FIG. 5, respectively. The preprocessor 2100 may include the multiplier 1100 of FIG. 5, and the preprocessor 2100 may calculate multiplication values DI<0:r> (r is n in FIG. 6) from the feature data F1<0:k> to Fn<0:k> and the weight data W1<0:k> to Wn<0:k> according to the embodiment described in FIG. 5. The preprocessor 2100 may generate multiplication values DI<0:r> in a format suitable for analog MAC calculation and provide the multiplication values DI<0:r> to the calculation core 2200. In addition, the preprocessor 2100 may provide the calculation core 2200 with offset input values ZI<0:r> for the calculation core 2200 operating in the offset mode of FIG. 5.

The calculation core 2200 may perform a calculation that accumulates the multiplication values DI<0:r>. The calculation core 2200 may include the components 110 to 170 of FIG. 1, the components 210 to 280 of FIG. 2, the components SW00 to SW0r, SW10 to SW1p, and AC of FIG. 4, and the accumulator 1200 of FIG. 5. The calculation core 2200 may operate according to the embodiments and principles described in FIGS. 1 to 4. The calculation core 2200 may output the output data DO as a result of the MAC calculation.

The postprocessor 2300 may postprocess the output data DO outputted from the calculation core 2200. The post-processed output data Dout may be in a format processable by an external device (e.g., a digital block using a MAC calculation result). The postprocessor 2300 may output post-processed output data Dout. The postprocessor 2300 may be implemented including dedicated circuits (e.g., FPGAs, ASICs, etc.) or may be implemented as a system on chip.

Figure 7:
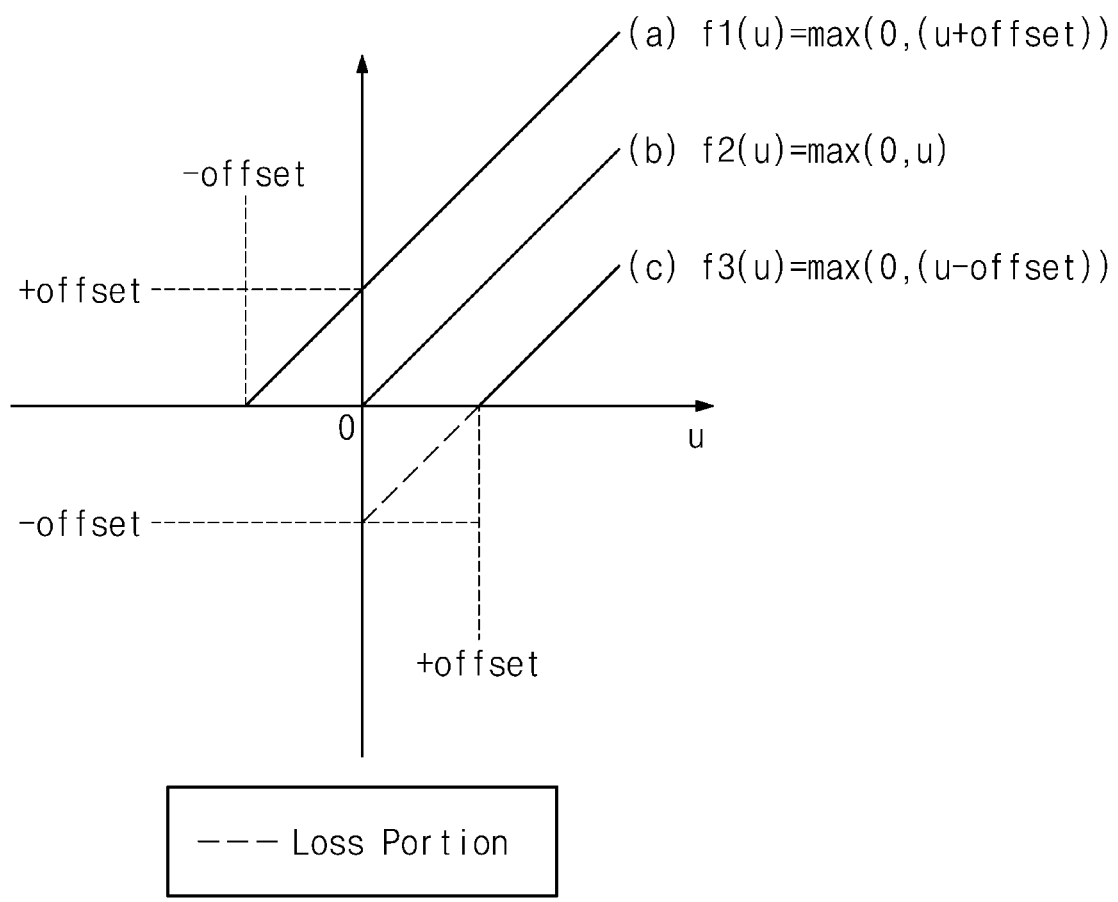
FIG. 7 is graphs showing a relationship between input and output of the neuromorphic arithmetic device of FIG. 6 according to offsets.

FIG. 7 is graphs showing a relationship between input and output of the neuromorphic arithmetic device of FIG. 6 according to offsets. In FIG. 7, the horizontal axis is input u and the vertical axis is outputs f1(u) to f3(u). The outputs f1(u) to f3(u) may be activation functions, and the input u may be an input to each of the functions f1(u) to f3(u). The input u may be a MAC calculation result, and for example, the input u may be the post-processed output data Dout of FIG. 6. The functions f1(u) to f3(u) may be expressed as f1(u)=max(0, (u+offset)), f2(u)=max(0, u), f3(u)=max(0, (u−offset)), respectively.

Graph (b) is a case where no offset occurs during the MAC calculation of the neuromorphic arithmetic device 2000. If the input u is less than zero, the output f2(u) may be zero. If the input u is greater than or equal to zero, the output f2(u) may be equal to the input u.

Graph (a) is a case where a positive offset +offset occurs during the MAC calculation of the neuromorphic arithmetic device 2000. If the input u is smaller than the negative offset −offset, the output f1(u) may be zero. If the input u is greater than or equal to the negative offset −offset, the output f1(u) may be the sum (u+offset) of the input and the positive offset. That is, the output f1(u) may further include an additional positive offset in addition to the input u. Therefore, the reliability (or recognition rate) of the output data Dout calculated from the neuromorphic arithmetic device 2000 may be reduced. As the positive offset +offset increases, the reliability (or recognition rate) of the output data Dout may further decrease.

Graph (c) is a case where a negative offset −offset occurs during the MAC calculation of the neuromorphic arithmetic device 2000. If the input u is smaller than the positive offset +offset, the output f3(u) may be zero. If the input u is greater than or equal to the positive offset +offset, the output f3(u) may be the sum (u−offset) of the input and the negative offset. That is, a loss portion of the input u may occur, and the output f3(u) may include only a portion of the input u excluding the loss portion. Therefore, the reliability (or recognition rate) of the output data Dout calculated from the neuromorphic arithmetic device 2000 may be drastically reduced. Reliability in the case of a negative offset −offset may be lower than reliability in the case of a positive offset +offset. According to embodiments and principles of correcting the offset described with reference to FIGS. 1 to 4, a positive offset +offset and a negative offset −offset may be reduced.

Figure 8:
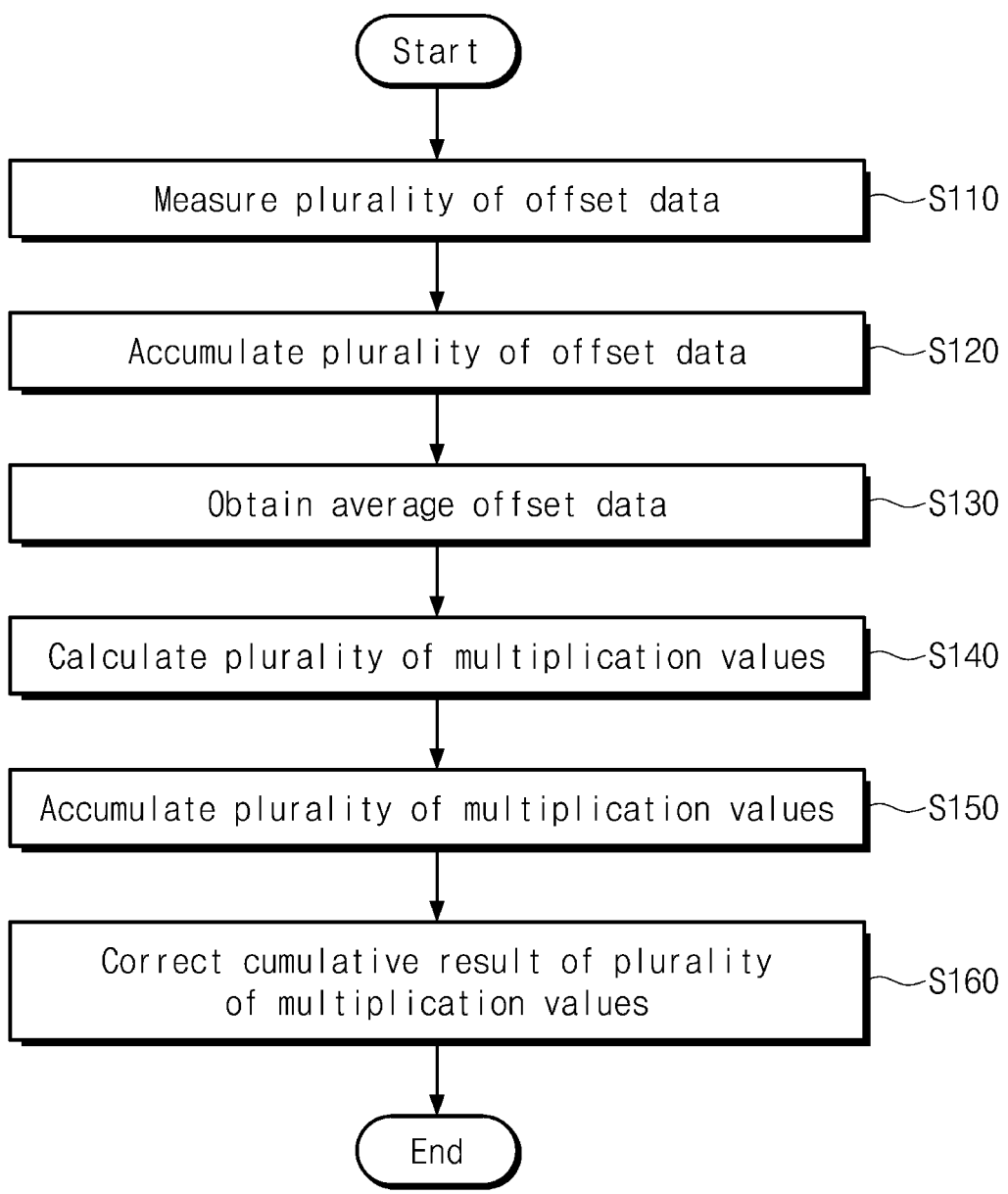
FIG. 8 is a flowchart illustrating a method of operating a neuromorphic arithmetic device according to an embodiment of the inventive concept.

FIG. 8 is a flowchart illustrating a method of operating a neuromorphic arithmetic device according to an embodiment of the inventive concept. FIG. 8 will be described with reference to FIGS. 1 to 7.

In operation S110, the neuromorphic arithmetic device 2000 may measure a plurality of offset data by a plurality of times. For example, the neuromorphic arithmetic device 2000 may measure the plurality of offset data by $2^k$ times (k is an integer of 1 or more). In operation S120, the neuromorphic arithmetic device 2000 may accumulate a plurality of offset data. In operation S130, the neuromorphic arithmetic device 2000 may obtain average offset data by extracting at least one bit from the accumulated offset data.

In operation S140, the neuromorphic arithmetic device 2000 may calculate a plurality of multiplication values DI<0:r> between a plurality of feature data F1<0:k> to Fn<0:k> and a plurality of weight data W1<0:k> to Wn<0:k>. In operation S150, the neuromorphic arithmetic device 2000 may accumulate a plurality of multiplication values DI<0:r>. In order for the accumulation of the plurality of multiplication values DI<0:r>, the neuromorphic arithmetic device 2000 may connect the accumulation capacitors (e.g., the first to R-th capacitors SC<0> to SC<r> of FIG. 4) with the correction capacitor (e.g., the correction capacitor AC of FIG. 4) at the same time.

In operation S160, the neuromorphic arithmetic device 2000 may correct the cumulative result of the plurality of multiplication values according to the average offset data. In order to correct the cumulative result of a plurality of multiply values DI<0:r> according to the average offset data, the neuromorphic arithmetic device 2000 may connect accumulation capacitors (e.g., the first to R-th capacitors SC<0> to SC<r> in FIG. 4) and offset capacitors (e.g., the first to P-th capacitors OC<0> to OC<p> in FIG. 4) with a correction capacitor (e.g., the correction capacitor AC of FIG. 4).

The neuromorphic arithmetic device 2000 may correct the cumulative results of the MAC calculation calculated using accumulation capacitors (e.g., the first to R-th capacitors SC<0> to SC<r> of FIGS. 1 and 4) according to average offset data. Therefore, the neuromorphic arithmetic device 100 may eliminate offset error of the cumulative result.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A neuromorphic arithmetic device that performs a multiply-accumulate (MAC) calculation using a multiplier and an accumulator, the neuromorphic arithmetic device comprising:
    an offset accumulator configured to receive a plurality of offset data measured a plurality of times and accumulate the plurality of offset data;
    a bit extractor configured to obtain average offset data by extracting at least one first bit from the plurality of accumulated offset data; and
    a cumulative synapse array configured to accumulate a plurality of multiplication values generated by the multiplier and output a cumulative result of the plurality of multiplication values corrected according to the average offset data.

2. The neuromorphic arithmetic device of claim 1, wherein the cumulative synapse array comprises a first capacitor charged by a first voltage corresponding to a first multiplication value among the plurality of multiplication values.

3. The neuromorphic arithmetic device of claim 2, wherein the cumulative synapse array further comprises a second capacitor charged by a second voltage corresponding to a second multiplication value among the plurality of multiplication values,
    wherein the first and second capacitors are simultaneously charged.

4. The neuromorphic arithmetic device of claim 2, further comprising a third capacitor charged by a third voltage corresponding to the first bit of the average offset data.

5. The neuromorphic arithmetic device of claim 4, further comprising a fourth capacitor charged by a fourth voltage corresponding to the cumulative result of the plurality of multiplication values corrected according to the average offset data through connection of the first and third capacitors.

6. The neuromorphic arithmetic device of claim 5, further comprising:
- a first switch located between the first capacitor and the fourth capacitor;
- a second switch located between the third capacitor and the fourth capacitor; and
- an offset controller configured to control the first and second switches to connect the fourth capacitor with the first and third capacitors after the first and third capacitors are charged.

7. The neuromorphic arithmetic device of claim 1, wherein the bit extractor further extracts at least one second bit from the plurality of accumulated offset data, and
the neuromorphic arithmetic device comprises:
- a fifth capacitor charged by a fifth voltage corresponding to the at least one first bit; and
- a sixth capacitor charged by a sixth voltage corresponding to the at least one second bit,
- wherein a capacitance of the fifth capacitor is different from a capacitance of the sixth capacitor.

8. The neuromorphic arithmetic device of claim 1, wherein the plurality of times is $2^k$, where k is an integer of 1 or more.

9. The neuromorphic arithmetic device of claim 8, wherein when the bit extractor extracts a plurality of bits from the plurality of accumulated offset data, the plurality of bits are continuous.

10. An operating method of a neuromorphic arithmetic device including an offset accumulator, a bit extractor, a multiplier, and a cumulative synapse array to perform a multiply-accumulate (MAC) calculation, the operating method comprising:
- measuring a plurality of offset data by a plurality of times;
- accumulating, by the offset accumulator, the plurality of offset data;
- obtaining, by the bit extractor, an average offset data by extracting at least one first bit from the plurality of accumulated offset data;
- calculating, by the multiplier, a plurality of multiplication values between a plurality of feature data and a plurality of weight data;
- accumulating, by the cumulative synapse array, the plurality of multiplication values; and
- correcting, by the cumulative synapse array, a cumulative result of the plurality of multiplication values according to the average offset data.

11. The operating method of claim 10, wherein the neuromorphic arithmetic device comprises:
- a plurality of accumulation capacitors configured to store the plurality of multiplication values, respectively; and
- a correction capacitor configured to store the cumulative result;
- wherein the accumulating of the plurality of multiplication values comprises simultaneously connecting the plurality of accumulation capacitors with the correction capacitor.

12. The operating method of claim 11, wherein the neuromorphic arithmetic device further comprises a plurality of offset capacitors configured to store a plurality of bits of the average offset data, respectively,
wherein the correcting of the cumulative result of the plurality of multiplication values according to the average offset data further comprises connecting the plurality of offset capacitors with the correction capacitor.

\* \* \* \* \*